United States Patent [19]

Stone et al.

[11] 4,303,159

[45] Dec. 1, 1981

[54] VIDEO PACKAGE

[75] Inventors: S. Gerald Stone, Los Angeles; Robert M. Emerson, N. Hollywood; Rollin Binzer, Calabasas, all of Calif.

[73] Assignee: National Video Group, Ltd., Los Angeles, Calif.

[21] Appl. No.: 155,400

[22] Filed: Jun. 2, 1980

[51] Int. Cl.³ ............................................ B65D 85/672
[52] U.S. Cl. ..................................... 206/387; 206/248
[58] Field of Search .................. 206/387, 248; 220/22, 220/22.1, 22.3

[56] References Cited

U.S. PATENT DOCUMENTS

| 3,081,867 | 3/1963 | Corey | 206/248 |
| 3,968,874 | 7/1976 | Corey | 206/248 |
| 4,162,112 | 7/1979 | Konkler | 206/387 X |
| 4,235,490 | 11/1980 | Schwartz et al. | 206/387 X |
| 4,253,568 | 3/1981 | Long et al. | 206/387 |

*Primary Examiner*—Steven M. Pollard
*Attorney, Agent, or Firm*—Richard H. Zaitlen

[57] ABSTRACT

A videocassette storage case for accommodating either Beta or VHS type videocassettes. The case has a generally rectangular shape and includes a hinged cover on its top. The interior of the case generally conforms in size to a VHS cassette, and the videocassette is held securely within the case by the hinged cover. An insert having an L-shaped surface may be positioned within the case to define a space which generally conforms in size to a Beta type videocassette. By using the insert, a Beta videocassette may be securely held within the case in the same fashion as is a VHS cassette. A window may be included for viewing the title of the cassette.

4 Claims, 2 Drawing Figures

VIDEO PACKAGE

BACKGROUND OF THE INVENTION

1. Field of the Invention

This invention relates to storage cases for magnetic tapes. More particularly, this invention relates to a storage case for videocassettes.

Two different types of videocassette systems have become popular with consumers in recent years. These systems are known as Beta and VHS. Although each system utilizes a videocassette which carries magnetic videotape, the size of the cassettes for the two types of systems is different. This size differential presents difficulties with respect to storage of the cassettes.

2. Description of the Prior Art

Generally, storage cases for videocassettes have been made to accommodate either a VHS cassette or a Beta cassette, i.e., two different sizes were employed. This generally does not present a problem to the consumer, since typically a consumer owns only one type of videocassette system. However, it does require that the manufacturer of a storage case make two different sizes of cases. Furthermore, in those instances where a person owns both a VHS and Beta videocassette system, the use of a single size case is preferable.

Recently, videocassette clubs have been started in which the club sells both cassettes to its members and provides a trading service between members. Since such a club would be dealing with both Beta and VHS videocassettes, separate storage and mailing cases would be required for each size. Such a requirement could be very cumbersome for this type of club, and it would therefore be very beneficial to provide a case which would accommodate both sizes of videocassettes. Such a case should also present a neat appearance protect the cassette from dust and contamination and securely hold each size of cassette.

Accordingly, it is one object of the present invention to provide a storage case which will accommodate both sizes of videocassettes presently in use. It is another object of the invention to provide a storage case which can be easily changed to accommodate either size videocassette.

SUMMARY OF THE INVENTION

The above and other objects are achieved by providing a generally rectangular plastic storage case having a hinged cover and interior dimensions which generally correspond to those of the large size videocassettes. In order to accommodate the smaller sized videocassette, a removable insert having an L-shaped surface is provided. The insert includes two lower legs which extend from the bottom of the L-shaped surface to the corners formed at the intersection of the sidewalls and bottom of the case. An additional leg extends from the top of the L-shaped surface and engages a notch in a sidewall of the case so as to secure the insert within the case. The L-shaped surface and one sidewall on the top of the case define an area which generally conforms to the shape of the smaller type of videocassette. When this type of videocassette is inserted into the case with the insert in place, the cover can be closed and secure the videocassette into a fixed position. Thus, by utilizing a removable insert, both sizes of videocassettes can be securely accommodated within a single size case.

The novel features which are believed to be characteristic of the invention, both as to its organization and method of operation, together with further objectives and advantages thereof, will be better understood from the following description considered in connection with accompanying drawings in which a presently preferred embodiment of the invention is illustrated by way of example. It is to be expressly understood, however, that the drawings are for the purpose of illustration and description only and not intended as a definition of the limits of the invention.

DETAILED DESCRIPTION OF THE DRAWINGS

Figure 1:
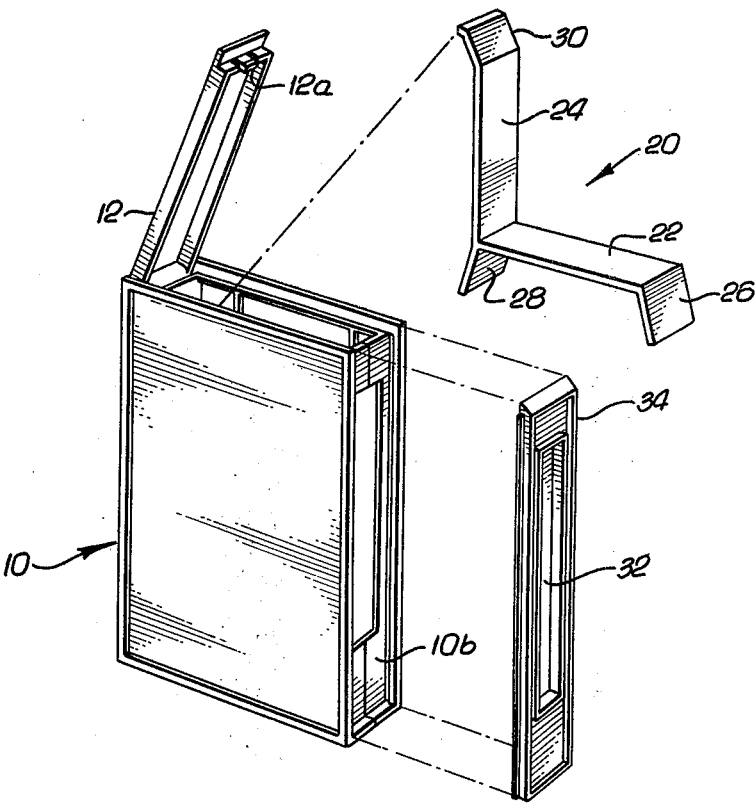
FIG. 1 is a side plan view of the videocassette storage base of the present invention.
Figure 2:
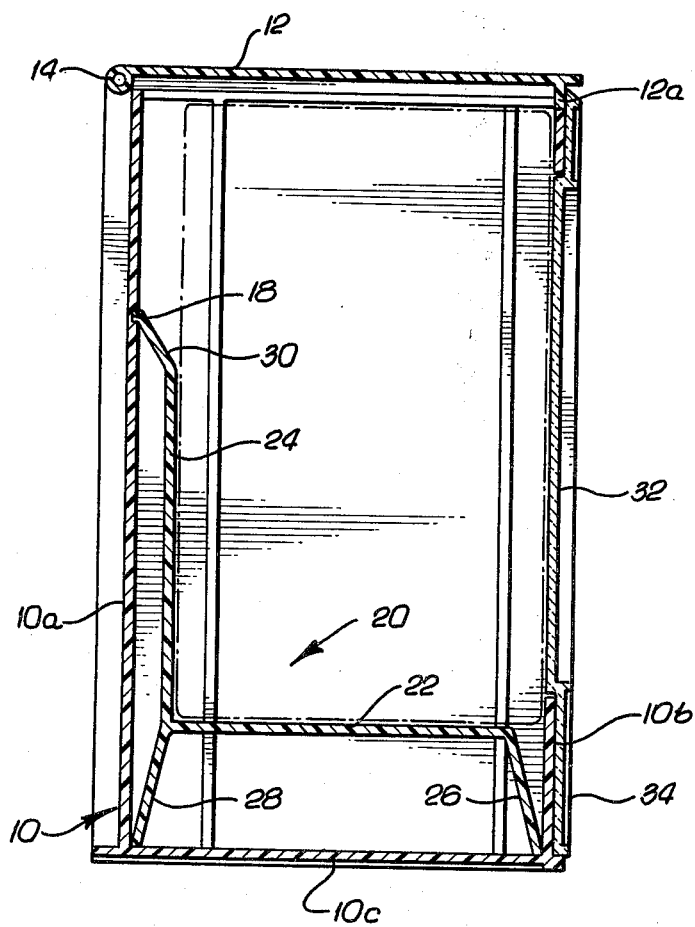
FIG. 2 is a front plan view of the videocassette storage case.

Referring to FIGS. 1 and 2, a storage case 10 having an open end includes two sidewalls 10a and 10b and a bottom wall 10c. Although many different materials may be used for the case 10, plastic is the preferred material. A cover 12 having a snap lock 12a is attached to the top of the case 10 by means of a hinge 14.

The interior dimensions of the case 10 generally conform to the size of the larger type of video cassette (VHS). When a videocassette is inserted into the case 10 and the cover 12 is snapped shut, the cassette is prevented from sliding in the cassette.

In order to accommodate the smaller type of video cassette (Beta) within the case 10, a removable insert 20 is provided. The insert 20 is preferably made of plastic and includes an L-shaped portion having a lower leg 22 and an upper leg 24. Extending from the lower leg 22 to the corners formed by the intersection of the walls of the case 10 are a pair of slanting legs 26 and 28. The legs 26 and 28 extend outwardly to such an extent that they wedge into the corners of the case 10. Extending from the top of the leg 24 toward the wall 10a is a leg 30. The top of the leg 30 engages a notch 18 which is formed in the wall 10a. The notch 18 serves to secure the insert 20 within the interior of the case 10.

The legs 22 and 24, the wall 10b and the cover 12 serve to define an area which generally corresponds in size to that of a Beta videocassette. When the cover 12 is closed, a Beta videocassette will be securely held within the case 10.

As may be seen more clearly in FIG. 2, a window 32 is attached to the sidewall 10b. The placement of the window 32 is such that the title of either a Beta or VHS videocassette which is contained in the case 10 can be seen. The window 32 may simply be defined by an opening in the wall 10b, or it may be defined by a decorative face plate 34 as shown in the drawings.

Thus, it can be seen that the present invention provides a storage case for videocassettes which conveniently and securely accommodates and protects either Beta or VHS type cassettes. The standard size of the case is such that it will securely hold a VHS cassette, and the storage of a Beta cassette is facilitated by placing an L-shaped insert within the case. The insert includes three legs which extend to the walls of the case and is held in place by means of wedging action of two of the legs and engagement of the third leg in a notch in the case.

Although a particular embodiment has been disclosed and described, it should be appreciated that variations and modifications will readily occur to those skilled in the art. Therefore, it is intended that the claims be interpreted to cover such variations.

We claim:

1. A storage case for videocassettes, comprising:
   a plastic, generally rectangular case having interior dimensions which substantially conform to the size of a first type of videocassette, whereby said cassette can be securely held within the case;
   a hinged cover attached to the case to permit access to the interior of the case;
   a notch formed on the interior of a first side wall of said case; and
   a removable insert located in the interior of the case and having an L-shaped surface which, along with a second wall and the top of said case, defines a space within the case which substantially conforms to the size of a second type of videocassette, wherein one end of the insert rests on the bottom of the case and the second end of the insert engages the notch to thereby secure the insert within the case.

2. The storage case of claim 1 wherein said insert includes an outwardly slanting upper leg extending from the top of the L-shaped surface and engaging the notch, and an outwardly slanting lower leg extending from each end of the bottom of the L-shaped surface, said lower legs engaging the corners of the case formed by the side walls and bottom.

3. The storage case of claim 1 wherein said second wall includes a window to enable viewing of the title of a videocassette carried in the case.

4. The storage case of claim 1 wherein said hinged cover includes means for preventing movement of a videocassette in the case.

* * * * *